(12) United States Patent
Dianetti et al.

(10) Patent No.: US 8,950,788 B2
(45) Date of Patent: Feb. 10, 2015

(54) COUPLING FOR USE WITH ULTRA LOW PERMEATION HOSE

(75) Inventors: Eugene Dianetti, Collierville, TN (US); Cary Haramoto, Germantown, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 67 days.

(21) Appl. No.: 13/318,936

(22) PCT Filed: May 4, 2010

(86) PCT No.: PCT/US2010/033479
§ 371 (c)(1),
(2), (4) Date: Nov. 4, 2011

(87) PCT Pub. No.: WO2010/129504
PCT Pub. Date: Nov. 11, 2010

(65) Prior Publication Data
US 2012/0060959 A1     Mar. 15, 2012

Related U.S. Application Data

(60) Provisional application No. 61/175,130, filed on May 4, 2009.

(51) Int. Cl.
*F16L 33/00* (2006.01)
*F16L 33/207* (2006.01)
(52) U.S. Cl.
CPC ............ *F16L 33/207* (2013.01); *Y10S 285/915* (2013.01)
USPC ............................................. 285/256; 285/915
(58) Field of Classification Search
USPC .................................................. 285/256, 915
See application file for complete search history.

(56) References Cited

U.S. PATENT DOCUMENTS

| 3,165,338 | A | | 1/1965 | Moss | |
|---|---|---|---|---|---|
| 6,010,162 | A | * | 1/2000 | Grau et al. | 285/256 |
| 6,827,375 | B2 | * | 12/2004 | Fraser | 285/258 |
| 7,857,010 | B1 | | 12/2010 | Davidson | |
| 2008/0136176 | A1 | * | 6/2008 | Katayama et al. | 285/256 |

FOREIGN PATENT DOCUMENTS

| DE | 3314907 | 12/1983 |
|---|---|---|
| EP | 0003142 | 7/1979 |
| EP | 0874184 | 10/1998 |

OTHER PUBLICATIONS

Merriam-Webster's Collegiate Dictionary, $10^{th}$ ed., 1998, 4 pages.*

(Continued)

*Primary Examiner* — Aaron Dunwoody
(74) *Attorney, Agent, or Firm* — Renner, Otto, Boisselle & Sklar, LLP

(57) ABSTRACT

A hose coupling assembly is provided for use with an ultra low permeable hose. The coupling utilizes multiple sealing techniques to ensure that no refrigerant escapes from the end of the hose. The techniques are mechanical crimping utilizing a shell with barbs, a chemical sealant on the cut end of the hose and between the hose and the shell, annular seals on the nipple portion of the coupling, and an annular weld or braze of the shell to the coupling body.

4 Claims, 1 Drawing Sheet

(56) References Cited

OTHER PUBLICATIONS

International Search Report relating to International Application No. PCT/US2010/033479, dated Jun. 2, 2010.

Patent Cooperation Treaty Search Report and Written Opinion of the International Searching Authority relating to International Application No. PCT/US2010/033479, dated Nov. 6, 2010.

* cited by examiner even a claim in the hose that is fully set (on the page) if your part not reducing or eliminating leakage, the couplings at the ends of the hose may allow leakage around the end of the vapor barrier.

COUPLING FOR USE WITH ULTRA LOW PERMEATION HOSE

CROSS REFERENCE TO RELATED APPLICATIONS

The present application claims the benefit of the filing date of U.S. Provisional Patent Application Ser. No. 61/175,130, filed May 4, 2009, the disclosure of which is incorporated herein by reference in its entirety.

TECHNICAL FIELD

The present invention relates to a coupling and in particular to a leak preventing coupling.

BACKGROUND

Low permeation hoses are often used in systems to eliminate or reduce escape and/or infiltration of vapors and/or gases. For example, such hoses may be used in refrigeration systems to prevent leakage of refrigerant vapors from the system into the environment. Such hoses are also common in fuel systems for preventing fuel vapors from escaping to the environment.

Another application of such hoses is in connection with heating systems for supplying and returning water (or other fluid) from one or more heat exchangers. In such applications, low permeation hoses are used to prevent oxygen from entering the heating system, which can result in corrosion of various components such as pumps and valves.

Low permeation hoses typically include an inner tube for carrying a fluid, and a vapor barrier layer surrounding the inner tube. Various other layers typically may surround the vapor barrier layer, such as a braiding, an outer tube, a cover or outer sheath, etc.

One such ultra low permeation hose is disclosed in International Patent Application PCT/US2008/78287, filed Sep. 30, 2008, entitled "Aluminum Foil Based Hose" is hereby incorporated by reference.

A problem with low permeation hoses is that while the hose may be effective in reducing or eliminating leakage, the couplings at the ends of the hose may allow leakage around the end of the vapor barrier.

SUMMARY

At least one embodiment of the invention provides a hose coupling assembly comprising: a connector member having a stem portion and a shell portion, the connector member having an internal passage formed therein, wherein the stem portion comprises an exterior stem surface; a hose having an end fitted over the exterior surface of the stem portion; the shell attached to the connector member by an annular weld or braze which seals the shell to the connector member; the shell having a plurality of barbs on an interior surface of the shell, the shell being mechanically crimped to the hose to attach the hose to the connector member; a chemical sealant covering the radial end surface, and exterior surface of the end of hose to provide a seal between the hose and the connector member; an annular groove formed in the exterior stem surface; an annular seal positioned partly in the groove, the annular seal sealingly engaging an interior surface of the end of the hose.

At least one embodiment of the invention provides A method of attaching a coupling to an end of a hose comprising the steps of: sealingly attaching a shell to a stem portion of a connection member by welding or brazing; positioning an annular seal at least partially into an annular groove formed in the exterior surface of the stem portion; applying an amount of a liquid chemical sealant on an interior surface of the shell and an inner radial surface of the shell; fitting an end of a hose over an exterior surface of the stem portion of the connection member such that the liquid chemical sealant completely covers a radial end surface of the hose and such that the liquid chemical sealant substantially fills an annular gap between the hose and the shell and the annular seal sealingly engages the interior of the hose; and crimping the shell onto the hose such that a plurality of barbs on an interior surface of the shell engage the exterior surface of the hose.

BRIEF DESCRIPTION OF THE DRAWINGS

Embodiments of this invention will now be described in further detail with reference to the accompanying drawings, in which.

DETAILED DESCRIPTION OF THE DRAWING

Figure 1:
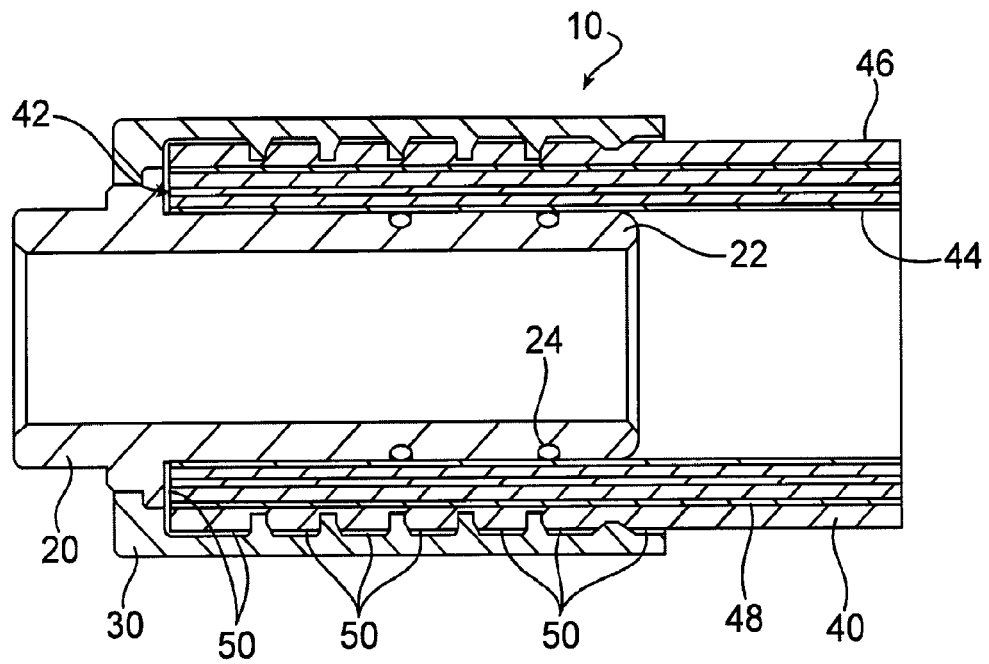
FIG. 1 is a cross-sectional view of an embodiment of a coupling attached to a hose in an accordance with the present invention.

Referring now to FIG. 1, a coupling 10 comprises a connector member or standpipe 20 having a stem or nipple portion 22 and a shell portion 30, and a hose 40. The hose 40 may be an ultra low permeation hose having an aluminum barrier layer 48. Shell 30 is attached to the connector member 20 by welding or brazing in a manner that the welding or brazing annularly seals the shell 30 to the connector member 20. The connector member 20 comprises a stem portion or nipple 22 which is inserted into the end of the hose 40 to attach the hose 40 to the connector member 20. The stem 22 of the connector member 20 is sealed to the interior of the hose 20 by barbs, o-rings 24, or liquid chemical sealant 50 or any combination of the three. The shell 30 is then sealingly attached to the hose 40 by crimping and/or a liquid chemical sealant 50.

In one embodiment of the invention the hose coupling 10 is formed by the steps of i) sealingly attaching a shell 30 to a connector member 20 by welding or brazing; ii) applying an amount of a liquid chemical sealant 50 into a hose receiving gap between a portion of the connector member 20 and the shell 30; iii) fitting an end of a hose 40 over an exterior surface of a portion of the connector member 20 such that the liquid chemical sealant 50 completely covers a radial end surface 42 of the hose 40 and such that the liquid chemical sealant 50 completely fills an annular gap between the hose 40 and the shell 30; and iv) optionally, crimping the shell 30 onto the hose 40.

Figure 2:
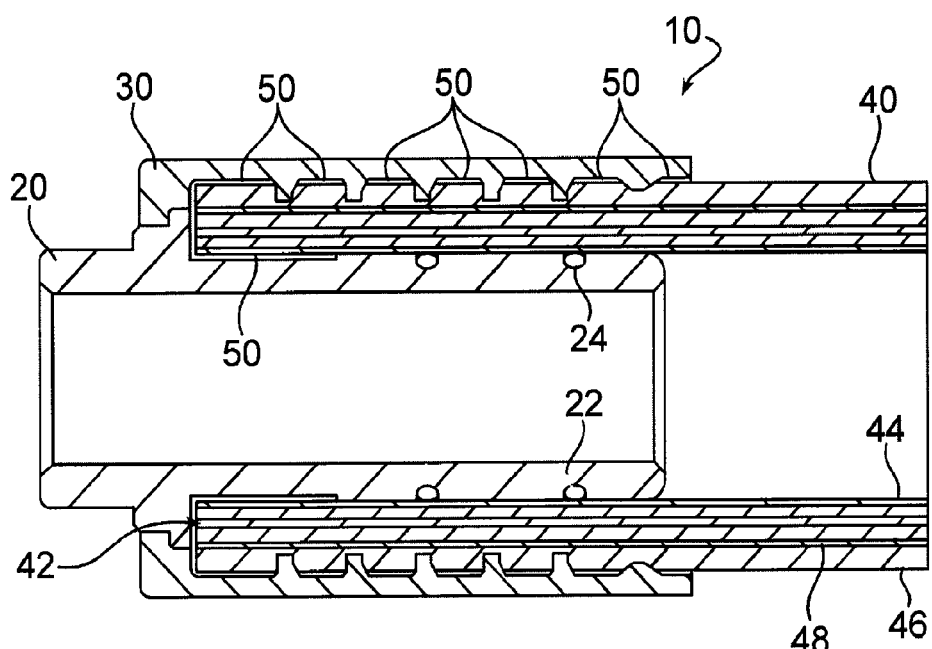
FIG. 2 is a cross-sectional view of another embodiment of a coupling attached to a hose in accordance with the present invention.

As shown in FIG. 2, it may be desirable to coat the stem portion 22 of the coupling member 20 with a liquid chemical sealant 50 to seal an interior of the hose 40 to the stem portion 22 of the coupling member 20. Sealant 50 is shown on entire length of outer surface of hose 40 and shell 30. This is the ideal as it makes the path for the refrigerant to escape more difficult. Any sealing of the end that prevents the refrigerant from escaping the cut end 42 of the hose 40 will help prevent leakage. The idea of using the sealant 50 on the inner wall 44, end 42, and outer wall 46 of the hose 40 insures that there is a complete seal of the cut end of the hose 40. It is noted that the sealant does not contact the annular seals 24.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

What is claimed is:

1. A hose coupling assembly comprising:
   a connector member having a stem portion and a shell portion, the connector member having an internal passage formed therein, wherein the stem portion comprises an exterior stem surface;
   a hose having an end fitted over the exterior surface of the stem portion;
   the shell attached to the connector member by an annular weld or braze which seals the shell to the connector member;
   the shell having a plurality of barbs on an interior surface of the shell, the shell with the barbs being mechanically crimped to the hose to attach the hose to the connector member;
   a chemical sealant covering a radial end surface and exterior surface of the end of hose to provide a seal between the hose and the connector member;
   an annular groove formed in the exterior stem surface; and
   an annular seal positioned partly in the groove, the annular seal sealingly engaging an interior surface of the end of the hose; and
   wherein the hose has a barrier layer comprising aluminum foil.

2. The hose coupling assembly of claim 1, wherein the chemical sealant also covers an interior portion of the hose adjacent the radial end portion of the hose.

3. The hose coupling assembly of claim 1 further comprising a second annular groove formed in the exterior stem surface offset from the first annular groove and a second annular seal positioned partly in the second groove, the annular seal sealingly engaging the interior surface of the end of the hose.

4. The hose coupling assembly of claim 2 wherein the chemical sealant does not contact the annular groove and the annular seal.

* * * * *